Figure 1:
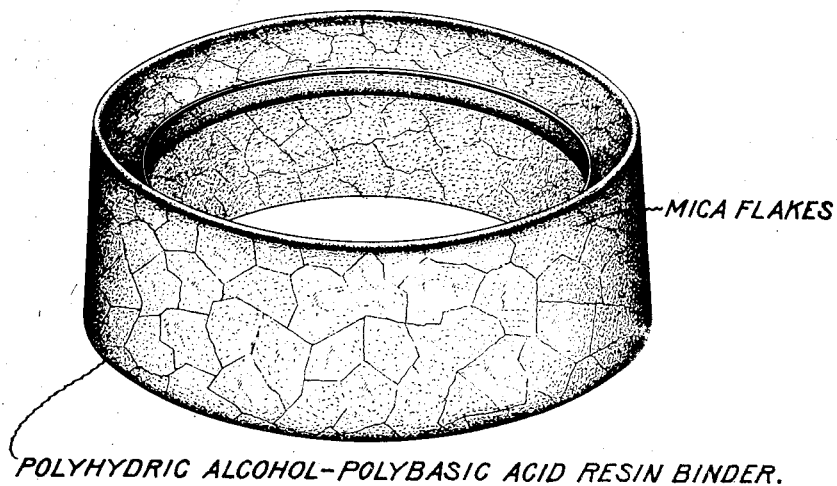

June 15, 1926.

L. E. BARRINGER ET AL

LAMINATED MICA PRODUCT

Filed Sept. 13, 1922

1,589,094

MICA FLAKES

POLYHYDRIC ALCOHOL-POLYBASIC ACID RESIN BINDER.

Inventors:
Lawrence E. Barringer,
Charles F. Peterson.
by
Their Attorney.

Patented June 15, 1926.

1,589,094

UNITED STATES PATENT OFFICE.

LAWRENCE E. BARRINGER AND CHARLES F. PETERSON, OF SCHENECTADY, NEW YORK, ASSIGNORS TO GENERAL ELECTRIC COMPANY, A CORPORATION OF NEW YORK.

LAMINATED MICA PRODUCT.

Application filed September 13, 1922. Serial No. 588,079.

The present invention relates to composite insulation containing mica and it is the particular object of our invention to provide mica compositions having improved physical and electrical properties.

The so called "pasted mica" consisting of plates or flakes of mica bonded together in stratified relation, has for many years been made by the use of a binder of natural gum, such as shellac or copal. Attempts have been made from time to time to use other binders but none have proved as suitable as shellac. However, shellac softens at comparatively low temperature (about 65 to 70° C.) and decomposes as the temperature increases, decomposition setting in rapidly between 175 and 200° C., hence, certain disadvantages accompany its use.

In assembly operations of commutators, temperatures as high as 300 to 350° C. may be reached, for instance, when commutators are immersed in molten tin during the "tinning" operation. Thus mica plates and cones used in commutator construction may be subjected to temperatures sufficiently high to cause the shellac to ooze out from the mica composition between the copper segments. At higher temperatures this escaped shellac when carbonized or decomposed may cause short circuits. When not actually carbonized partial decomposition of the shellac will yield decomposition products through destructive distillations which are deposited upon the various parts of the commutator and which are not only conductive in themselves but attack the copper and form additional deleterious non-insulating substances. Even when the shellac does not escape, its softening will cause sliding of the mica plates when under pressure. In commutator construction, this displacement of the mica plates will leave the commutator bars loose. It has been attempted to overcome these difficulties by using a phenolic condensation product as a binder for composite mica articles but it was found this material would not adhere to mica with sufficient tenacity, nor bond mica plates together sufficiently well to form an adequately dense and strong insulation. Phenolic condensation products also carbonize rather readily.

We have discovered that esters of polyhydric alcohols fulfill all of the exacting conditions requisite for a bonding agent in mica compositions, both in physical and electrical properties and adhere with such tenacity to mica that cemented mica articles formed thereby ring when struck, as though made of steel, while at the same time being sufficiently thermoplastic even when fully cured to yield somewhat at high temperatures so as to be moldable sufficiently to permit some shaping of the mica articles during assembly as parts of electrical machinery or other structures. Our invention, therefore, comprises new laminated structures or articles comprising mica plates joined to each other by a bond constituted by an ester of a polyhydric alcohol.

Figure 2:
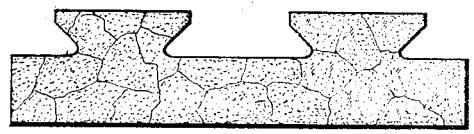

Two embodiments of our invention are shown in the accompanying drawing, namely, in Fig. 1 a mica commutator cone and in Fig. 2 a mica plate of the form used for commutator insulation.

We prefer to use the reaction product of glycerine and phthalic anhydrid described in Callahan Patent 1,108,329 in the soluble, fusible condition characteristic of the first stage of the reaction. Conveniently the ester is applied as an acetone solution to the surface of the mica plates and is drawn in between the laps of the mica flakes by capillary force. In some cases we may build up the mica plates by superimposing dry mica flakes to the required thickness without a binder. The binder then is introduced in solution between the laminæ by immersing the plates in the solution, thus depending entirely on the capillary force to distribute the binder.

In the manufacture of built-up mica articles as for example, commutator cones, a stack of sheet material is first made as above described. After evaporation of the acetone solvent this sheet material is heated in a press to a temperature of approximately 175° C. At this temperature reaction takes place in the glycerine ester, as described in the Patents No. 1,108,329, and No. 1,108,330 which if continued will result in the ester becoming hard, non-fusible and insoluble. As it is not desired that the ester assume the non-fusible state before the article of mica has been shaped, the heating is discontinued while the binder is still in an intermediate thermoplastic state.

In this condition the plate is subjected to machining operations to preform blanks or developed shapes of the mica articles which we may desire to make. These developed shapes are then formed and put into moulds which have been heated to 250° C., and at once put in a press which presses the mica into its final form, such, for example as shown in Fig. 1. The moulds and mica compositions are then taken out of the press and placed in an oven maintained at about 300° C. for sufficient length of time to polymerize the binder. No hard and fast molding and polymerizing temperatures for preforming and for polymerizing can be given which will apply to all cases. However, the temperature range in general varies within 100 to 300° C., the lower temperatures of this range being adapted for the preliminary curing and the higher temperatures for the final hardening operation. The moulds are then taken out, again placed in a press and held under pressure until cooled off either by the natural loss of heat or by artificial cooling. In some cases articles not moulded are subjected to a special heating treatment to cure same, as for example laminated mica plates, such as illustrated in Fig. 2.

The resulting article is mechanically stronger than an article produced by the use of shellac as a binder, and there is no tendency for the mica plates to slip over each other when the composite mica is subjected to high temperature nor for mica insulating parts, as tubes, to collapse under heat as will occur with shellac-pasted articles.

The binding or bonding material described is insoluble in water and mineral oil after it has been hardened by the proper treatment under heat and pressure and therefore the mica insulations produced with this material are resistant to both water and mineral oils.

The electric insulating properties are superior to shellac pasted mica. Articles, produced in accordance with our invention may be subjected to the high temperatures encountered in the manufacture and operation of electric apparatus without deterioration or decomposition of binder.

For example, in some cases it is desired to subject such electric apparatus to the temperature of molten tin. It has been found that mica articles made as above described may be held in a tin bath at a temperature of 300° C. or even higher for six to seven minutes without injury. At these high temperatures the glycerine resin or ester instead of becoming soft and letting go its hold upon the mica, tends to become even harder and stronger if it has not already been converted into the final, infusible stage.

While we have described our invention with particular reference to the production of a laminated structure containing as a bond a phthalic resin, we can utilize resins containing other polybasic acids, depending on the property desired of the product. For example, a more flexible product may be made using a malic acid resin. In a similar way other resins consisting of the reaction product of a mixture of polybasic acids and glycerine or other polyhydric alcohol or mixture of polyhydric alcohols may be used as binders for laminated mica structures.

In a divisional application Serial No. 22,213 claims are made on the process of forming mica structures which is herein described.

What we claim as new and desire to secure by Letters Patent of the United States, is:

1. A laminated structure comprising flakes of mica superimposed upon each other and secured together with a reaction product of a polyhydric alcohol and a polybasic acid.

2. A laminated article comprising flakes of mica superimposed upon each other and bound together with an infusible, insoluble resinous compound of glycerine and phthalic anhydride.

3. A shaped electric insulator comprising flakes of mica secured together in laminated relation with a compound of a polyhydric alcohol and polybasic acid in a substantially nonfusible, insoluble condition.

In witness whereof, we have hereunto set our hands this 12th day of September, 1922.

LAWRENCE E. BARRINGER.
CHARLES F. PETERSON.